United States Patent
Kim et al.

(10) Patent No.: US 7,177,240 B2
(45) Date of Patent: Feb. 13, 2007

(54) OPTICAL DISC SYSTEM AND METHOD FOR CONTROLLING MOVEMENT OF AN OPTICAL PICKUP TO AN INNERMOST PERIMETER OF AN OPTICAL DISC USING TRACK INFORMATION

(75) Inventors: Je-Kook Kim, Yongin-si (KR); Young-Wook Jang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 552 days.

(21) Appl. No.: 10/817,291

(22) Filed: Apr. 2, 2004

(65) Prior Publication Data
US 2004/0196749 A1    Oct. 7, 2004

(30) Foreign Application Priority Data
Apr. 4, 2003    (KR) ............... 10-2003-0021420

(51) Int. Cl.
*G11B 7/00*    (2006.01)
(52) U.S. Cl. ............... 369/44.11; 369/53.24; 369/53.29
(58) Field of Classification Search ........... 369/44.27, 369/44.28, 44.26, 44.29, 44.11, 53.39, 53.29, 369/53.24, 117.4
See application file for complete search history.

(56) References Cited

U.S. PATENT DOCUMENTS 5,974,013 A * 10/1999 Kadono ............... 369/47.49
6,804,176 B1    10/2004 Komazaki

FOREIGN PATENT DOCUMENTS

| EP | 0583638 | 2/1994 |
| JP | 7176057 | 7/1995 |
| JP | 00251269 | 9/2000 |

* cited by examiner

*Primary Examiner*—Nabil Hindi
(74) *Attorney, Agent, or Firm*—F. Chau & Associates, LLC

(57) ABSTRACT

Optical disc systems and methods for controlling movement of an optical pickup to an innermost perimeter of an optical disc using track information are provided. For example, an optical disc system includes an optical pickup that includes a tracking actuator, a focus actuator, and an objective lens and radiates a laser beam onto the optical disc to detect light reflected from the optical disc. The optical disc system also includes a radio frequency amplifier, a sled motor, a servo driver, and a servo signal processor that includes an optical pickup movement determiner and outputs a servo control signal, the optical pickup movement determiner determining from a track-related signal whether tracks are detected on the optical disc at a current position of the optical pickup and outputting a track determination signal indicating whether the optical pickup has moved to the innermost perimeter of the optical disc, based on the determination result.

27 Claims, 14 Drawing Sheets

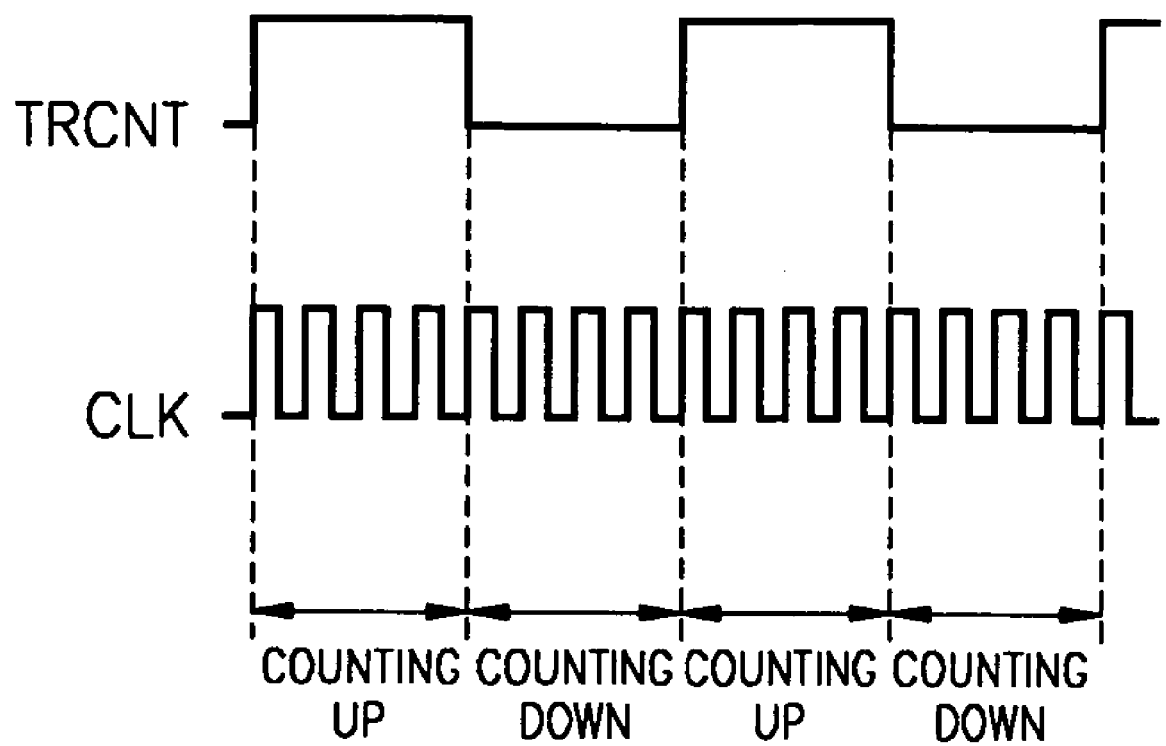

OPTICAL DISC SYSTEM AND METHOD FOR CONTROLLING MOVEMENT OF AN OPTICAL PICKUP TO AN INNERMOST PERIMETER OF AN OPTICAL DISC USING TRACK INFORMATION

CROSS-REFERENCE TO RELATED APPLICATION

This application claims priority to Korean Patent Application No. 2003-21420, filed on Apr. 4, 2003, which is incorporated herein by reference in its entirety.

TECHNICAL FIELD OF THE INVENTION

The present invention relates, generally, to an optical disc system, and more particularly, to an optical disc system and method for controlling movement of an optical pickup to an innermost perimeter of an optical disc using track information.

BACKGROUND

As shown in FIG. 1, an optical disc 11, such as a compact disc (CD) or a digital versatile disc (DVD), is generally divided into three areas: a lead-out area, a data area, and a lead-in area. The lead-out area includes information indicating an end track. The data area includes audio information, video information, and so forth. The lead-in area includes a list of the information recorded in the data area, i.e., a table of contents (TOC) including information such as addresses of start and end tracks, and other various types of information related to the optical disc 11.

A micro controller unit (MCU) of a conventional optical disc system controls movement of an optical pickup to an innermost perimeter of the optical disc 11 to read the TOC information when the optical disc 11 is loaded into the conventional optical disc system. The conventional optical disc system also uses a limit switch to control movement of the optical pickup to the innermost perimeter of the optical disc 11.

FIG. 2 is a block diagram of a conventional optical disc system including a limit switch. Referring to FIG. 2, an optical disc system 10 includes an optical pickup 12, a radio frequency (RF) amplifier 13, a digital signal processor (DSP) 14, a servo signal processor (SSP) 15, a MCU 16, a digital-to-analog converter (DAC) 17, a servo driver 18, a spindle motor 23, a sled motor 24, and a limit switch 25. The servo driver 18 includes a focus servo driver 19, a tracking servo driver 20, a sled servo driver 21, and a spindle servo driver 22. The limit switch 25 is positioned in the vicinity of the innermost perimeter of the optical disc 11. One node of the limit switch 25 is grounded, and the other node of the limit switch 25 is connected to the MCU 16.

FIG. 3 is a timing diagram showing major signals used to move the optical pickup 12 of the optical disc system 10 of FIG. 2 to the innermost perimeter of the optical disc 11. As shown in FIG. 3, the limit switch 25 outputs a limit signal LMS with a predetermined voltage level when the limit switch 25 is switched off. The limit switch 25 outputs the limit signal LMS with a ground voltage level when the limit switch 25 is switched on.

The limit switch 25 is switched on when the sled motor 24 moves the optical pickup 12 to the innermost perimeter of the optical disc 11, and thus the optical pickup 12 is connected to the limit switch 25. As a result, the limit switch 25 outputs the limit signal LMS with the ground voltage level to the MCU 16. When the MCU 16 receives the limit signal LMS with the ground voltage level, the MCU 16 determines that the optical pickup 12 has moved to the innermost perimeter of the optical disc 11 and outputs a predetermined control signal to the SSP 15 so as to stop operation of the sled motor 24. Here, the sled motor 24 is controlled by a voltage level of a control signal SLD output from the sled servo driver 21. In more detail, as shown in FIG. 3, when the control signal SLD has a less voltage level than a predetermined reference voltage level, the sled motor 24 rotates in a reverse direction. When the control signal SLD has the same voltage level as the predetermined reference voltage level, the sled motor 23 stops its rotation operation.

Meanwhile, to make optical disc systems lighter and slimmer, various methods have been investigated to control the movement of an optical pickup to an innermost perimeter of an optical disc without using a limit switch. For example, one method is to control the movement of the optical pickup to the innermost perimeter of the optical disc using sub-Q data recorded on the optical disc. Sub-Q data refers to information recorded in a data area of the optical disc and includes, for example, information on time required for reproducing the recorded data. In this method, sub-Q data is read at predetermined intervals in the data area while the optical pickup moves toward the innermost perimeter of the optical disc, a current position of the optical pickup is calculated from the read sub-Q data, and the optical pickup is moved to the innermost perimeter of the optical disc. The problem with this method is that a focus servo, a tracking servo, a spindle servo, and a sled servo must be driven to actuate the moving parts of the optical disc system, and the sub-Q data must be iteratively read. Thus, it takes a long time to read TOC information.

Another example of a method of controlling movement of an optical pickup to the innermost perimeter of an optical disc without using a limit switch is disclosed in U.S. Pat. No. 5,173,887. In this method, the distance the optical pickup must move to get to the innermost perimeter of the optical disc is determined experimentally for various starting positions and put into a table. During operation of the optical pickup, the starting position is determined by reading sub-Q data from the optical disc. Then, the distance to the innermost perimeter of the optical disc is obtained from the table, and the optical pickup is moved the obtained distance toward the innermost perimeter of the optical disc. The problem with this method is that the distances stored in the table are imprecise and sometimes inaccurate. Also, additional memory is required to store the table.

Therefore, a need exists for an optical disc system and a method for reducing the time required for reading TOC information and accurately controlling the movement of an optical pickup to an inner perimeter of an optical disc.

SUMMARY OF THE INVENTION

Exemplary embodiments of the invention generally include an optical disc system and method for reducing time required for reading TOC information and accurately controlling movement of an optical pickup to an innermost perimeter of an optical disc using track information, wherein a determination as to whether the optical pickup has moved to the innermost perimeter of the optical disc is made based on whether tracks are detected on the optical disc at the current position of the optical pickup.

According to an exemplary embodiment of the present invention, an optical disc system for controlling movement of an optical pickup to an innermost perimeter of an optical disc using track information includes an optical pickup that radiates a laser beam onto the optical disc to detect light reflected from the optical disc and includes a tracking actuator, a focus actuator and an objective lens, a radio frequency amplifier that converts the reflected light into an electric signal to output a track-related signal, a sled motor that moves the optical pickup toward an inner or outer perimeter of the optical disc in response to a sled servo drive signal, a servo driver that outputs the sled servo drive signal and a tracking servo drive signal in response to one of a first servo control signal and a second servo control signal, and a servo signal processor that includes an optical pickup movement determiner and outputs one of the first servo control signal and the second servo control signal, the optical pickup movement determiner determining from the track-related signal whether tracks are detected on the optical disc at a current position of the optical pickup and outputting a track determination signal indicating whether the optical pickup has moved to the innermost perimeter of the optical disc, based on the determination result. The tracking actuator moves the objective lens toward the inner or outer perimeter of the optical disc in response to the tracking servo drive signal.

According to another exemplary embodiment of the present invention, an optical disc system for controlling movement of an optical pickup to an innermost perimeter of an optical disc using track information includes an optical pickup that radiates a laser beam onto the optical disc to detect light reflected from the optical disc and includes a tracking actuator, a focus actuator and an objective lens, a radio frequency amplifier that converts the reflected light into an electric signal to output a track-related signal, a sled motor that moves the optical pickup toward an inner perimeter of the optical disc in response to a first sled servo drive signal, and toward an outer perimeter of the optical disc in response to a second sled servo drive signal, a servo driver that outputs the first sled servo drive signal and a first tracking servo drive signal in response to a first servo control signal, and outputs the second sled servo drive signal and a second tracking servo drive signal in response to a second servo control signal, a micro controller unit that outputs a limit check command, determines from the track-related signal whether tracks are detected on the optical disc at a current position of the optical pickup and, if it is determined that tracks are not detected, outputs a limit check completion signal, and a servo signal processor that outputs the first servo control signal in response to the limit check command, and outputs the second servo control signal in response to the limit check completion signal. The tracking actuator moves the objective lens toward the inner perimeter of the optical disc in response to the first tracking servo drive signal and toward the outer perimeter of the optical disc in response to the second tracking servo drive signal.

According to still another exemplary embodiment of the present invention, a method of controlling movement of an optical pickup of an optical disc system includes a micro controller unit outputting a limit check command, a servo signal processor driving a focus servo using a focus actuator of an optical pickup in response to the limit check command, applying a reverse kick voltage to a sled motor, applying a reverse jump voltage to a tracking actuator of the optical pickup, an optical pickup movement determiner of the servo signal processor receiving a track-related signal and determining whether tracks are detected on an optical disc at a current position of the optical pickup, if it is determined that tracks are detected, returning to the steps of receiving of the track-related signal and determining whether the tracks are detected on the optical disc, and if it is determined that tracks are not detected, stopping operations of the sled motor and the tracking actuator.

These and other exemplary embodiments, features, aspects, and advantages of the present invention will be described and become apparent from the following detailed description of the exemplary embodiments when read in conjunction with the accompanying drawings.

BRIEF DESCRIPTION OF THE DRAWINGS

FIG. 9B is a timing diagram showing a track change signal and a clock signal to explain a counting operation of a second counter of FIG. 8.

DETAILED DESCRIPTION OF EXEMPLARY EMBODIMENTS

Figure 1:
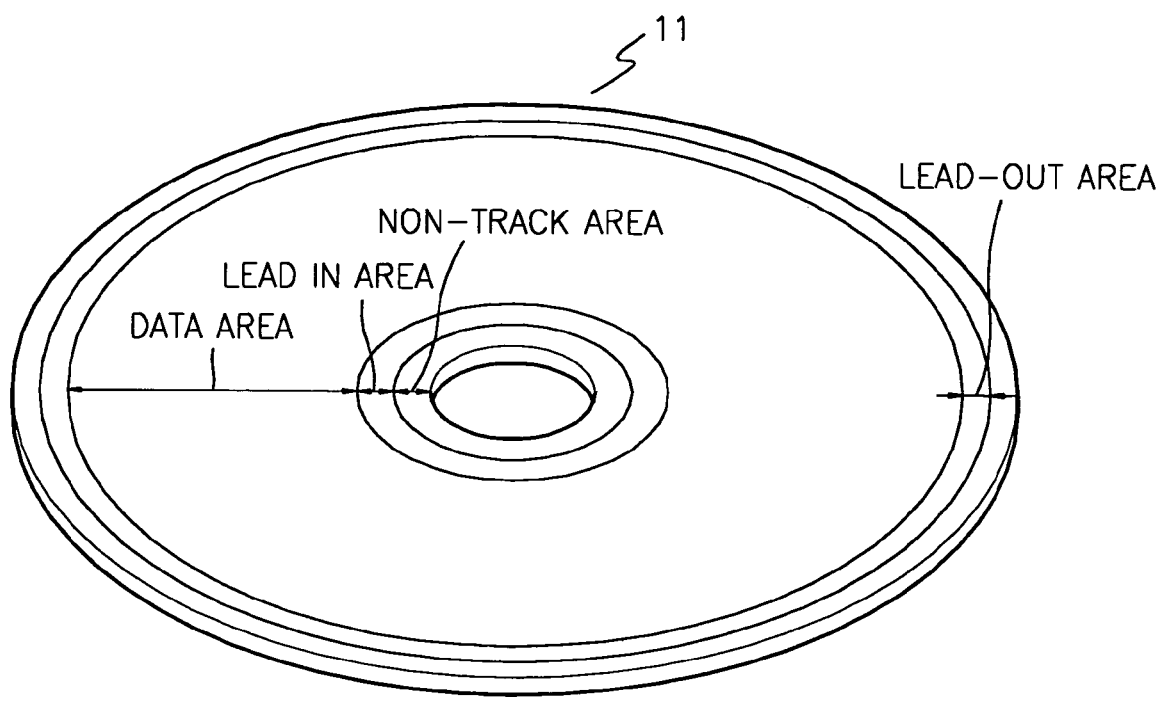
FIG. 1 shows a general optical disc.
Figure 2:
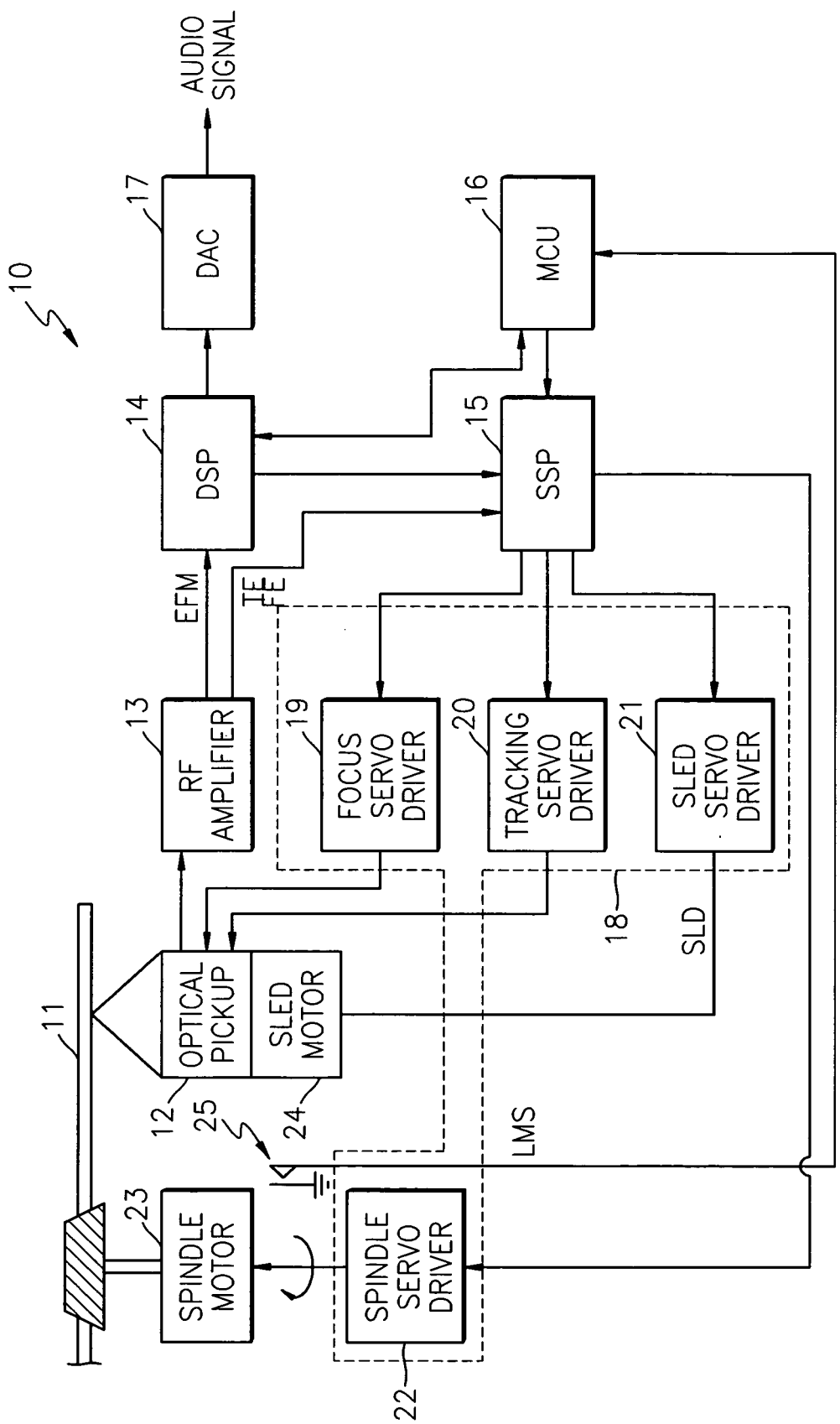
FIG. 2 is a block diagram of a conventional optical disc system including a limit switch.
Figure 3:
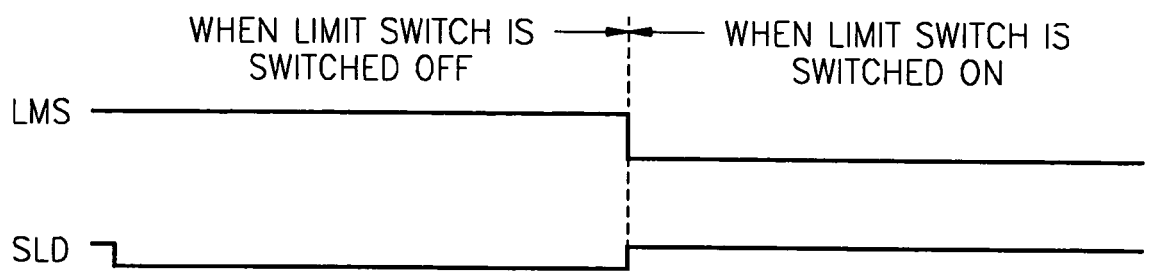
FIG. 3 is a timing diagram showing major signals used to move an optical pickup of the optical disc system of FIG. 2 to an innermost perimeter of an optical disc.

Hereinafter, exemplary embodiments of the present invention will be described in detail with reference to the attached drawings. Like reference numerals denote like members throughout the drawings.

Figure 4:
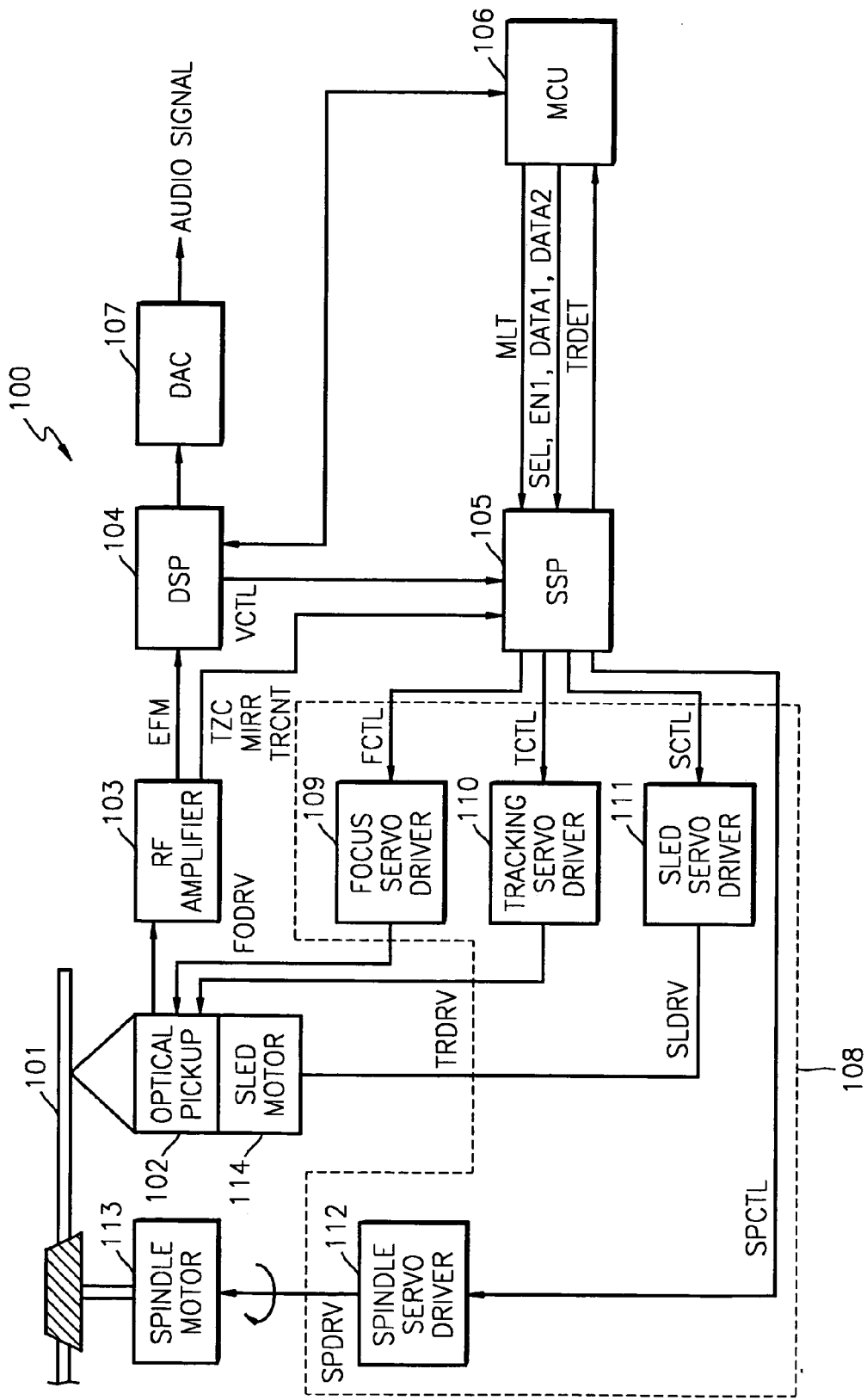
FIG. 4 is a block diagram of an optical disc system for controlling movement of an optical pickup to an innermost perimeter of an optical disc using track information, according to an exemplary embodiment of the present invention.

FIG. 4 is a block diagram of an optical disc system for controlling movement of an optical pickup to an innermost perimeter of an optical disc using track information, according to an exemplary embodiment of the present invention.

Referring to FIG. 4, an optical disc system 100 includes an optical pickup 102, an RF amplifier 103, a DSP 104, an SSP 105, an MCU 106, a DAC 107, a servo driver 108, a spindle motor 113, and a sled motor 114.

The optical pickup 102 radiates a laser beam onto tracks of an optical disc 101 and detects light reflected from the optical disc 101. The RF amplifier 103 converts the reflected light into an electric signal to output a digital data signal EFM, a track zero-cross signal TZC, a mirror signal MIRR, and a track change signal TRCNT. Although not shown in FIG. 4, the RF amplifier 103 also outputs various error signals such as a tracking error signal TE, a focus error signal FE, and the like.

Here, the track zero-cross signal TZC is generated when the optical pickup 102 hones in on a track. The mirror signal MIRR is generated in a non-data portion between tracks when the optical pickup 102 reads data from the optical disc 101. A track change signal generator 200 of FIG. 5 generates the track change signal TRCNT in response to the track zero-cross signal TZC and the mirror signal MIRR. The track zero-cross signal TZC, the mirror signal MIRR, and the track change signal TRCNT will be explained later in more detail with reference to FIGS. 5 and 6.

The DSP 104 recovers an audio signal from the digital data signal EFM, and the DAC 107 converts the audio signal into an analog signal and outputs the analog signal. The DSP 104 also detects a frame synchronous pattern from the digital data signal EFM and outputs a spindle motor control signal VCTL based on the frame synchronous pattern to the SSP 105.

The SSP 105 generates a focus servo control signal FCTL from the focus error signal FE and outputs the focus servo control signal FCTL to a focus servo driver 109. The SSP 105 generates a tracking servo control signal TCTL from the tracking error signal TE and outputs the tracking servo control signal TCTL to a tracking servo driver 110. The SSP 105 also generates a spindle servo control signal SPCTL in response to the spindle motor control signal VCTL and outputs the spindle servo control signal SPCTL to a spindle servo driver 112. The SSP 105 is controlled by the MCU 106 so as to generate a sled servo control signal SCTL and output the sled servo control signal SCTL to a sled servo driver 111. Here, although not shown in FIG. 4, the spindle servo control signal SPCTL includes first and second spindle servo control signals SPCTL1 and SPCTL2, the tracking servo control signal TCTL includes first and second tracking servo control signals TCTL1 and TCTL2, and the sled servo control signal SCTL includes first, second, and third sled servo control signals SCTL1, SCTL2, and SCTL3.

The MCU 106 outputs a limit check command MLT and predetermined control signals to the SSP 105 so as to move the optical pickup 102 to the innermost perimeter of the optical disc 101. The predetermined control signals are a selection signal SEL, a first enable signal EN1, first data DATA1, and second data DATA2. Although not shown in FIG. 4, the MCU 106 outputs other control signals as well.

The servo driver 108 includes the focus servo driver 109, the tracking servo driver 110, the sled servo driver 111, and the spindle servo driver 112.

The focus servo driver 109 outputs a focus servo drive signal FODRV in response to the focus servo control signal FCTL. A focus actuator (not shown) inside the optical pickup 102 moves the optical pickup 102 up and down in response to the focus servo drive signal FODRV.

The tracking servo driver 110 outputs a tracking servo drive signal TRDRV in response to the tracking servo control signal TCTL. In response to the tracking servo drive signal TRDRV, a tracking actuator (not shown) inside the optical pickup 102 moves an objective lens 31 of FIG. 14 inside the optical pickup 102 in a radial direction so that the laser beam stays focused on a predetermined track.

The sled servo driver 111 outputs a sled servo drive signal SLDRV in response to the sled servo control signal SCTL. The sled motor 114 moves the optical pickup 102 from an inner perimeter of the optical disc 101 to an outer perimeter of the optical disc 101 or from the outer perimeter to the inner perimeter in response to the sled servo drive signal SLDRV.

The spindle servo driver 112 outputs first and second spindle servo drive signals SPDRV1 and SPDRV2 in response to the first and second spindle servo control signals SPCTL1 and SPCTL2, respectively.

The spindle motor 113 rotates the optical disc 101 at a constant linear velocity (CLV) or a constant angular velocity (CAV) in response to the first spindle servo drive signal SPDRV1. In addition, the spindle motor 113 stops the rotation of the optical disc 101 in response to the second spindle servo drive signal SPDRV2.

The operation of the optical disc system 100 with the above-described structure will now be described with reference to FIGS. 4, 7, and 9A.

Figure 7:
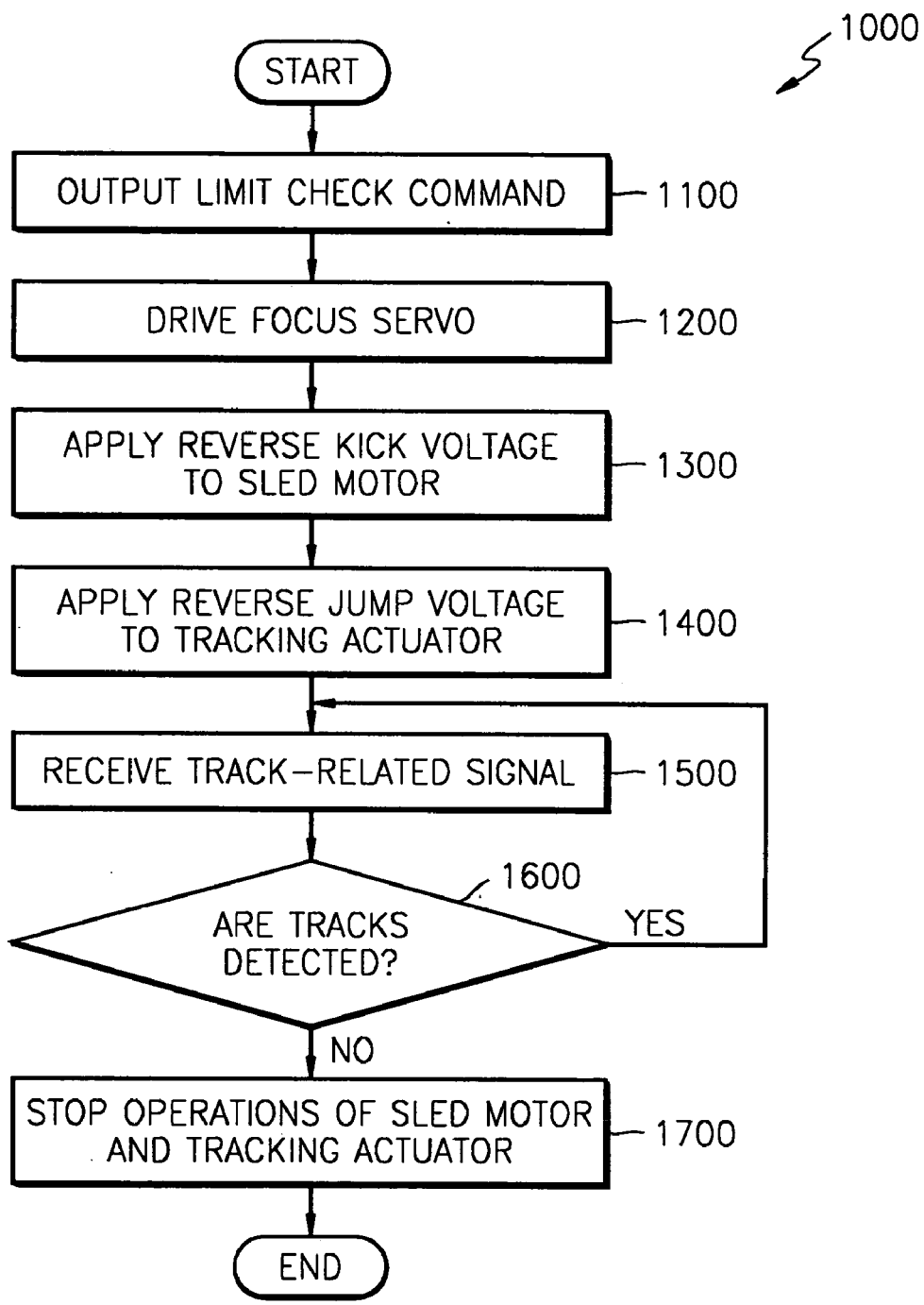
FIG. 7 is a flowchart illustrates a method of controlling movement of the optical pickup of the optical disc system of FIG. 4 to an innermost perimeter of an optical disc, according to another exemplary embodiment of the present invention.

FIG. 7 is a flowchart illustrating an operation 1000 of the optical disc system 100 of FIG. 4 moving the optical pickup 102 to the innermost perimeter of the optical disc 101.

In step 1100, the MCU 106 outputs the limit check command MLT. The SSP 105 then outputs the focus servo control signal FCTL, the first sled servo control signal SCTL1, and the first tracking servo control signal TCTL1 in response to the limit check command MLT.

In step 1200, the focus servo driver 109 outputs the focus servo drive signal FODRV in response to the focus servo control signal FCTL. Then, the focus actuator of the optical pickup 102 moves the optical pickup 102 up and down so as to adjust the focus of the laser beam on the optical disc 101 in response to the focus servo drive signal FODRV. In addition, the SSP 105 outputs the first spindle servo control signal SPCTL1 to rotate the optical disc 101 at the CLV or CAV or outputs the second spindle servo control signal SPCTL2 to stop rotation of the optical disc 101.

Figure 9A:
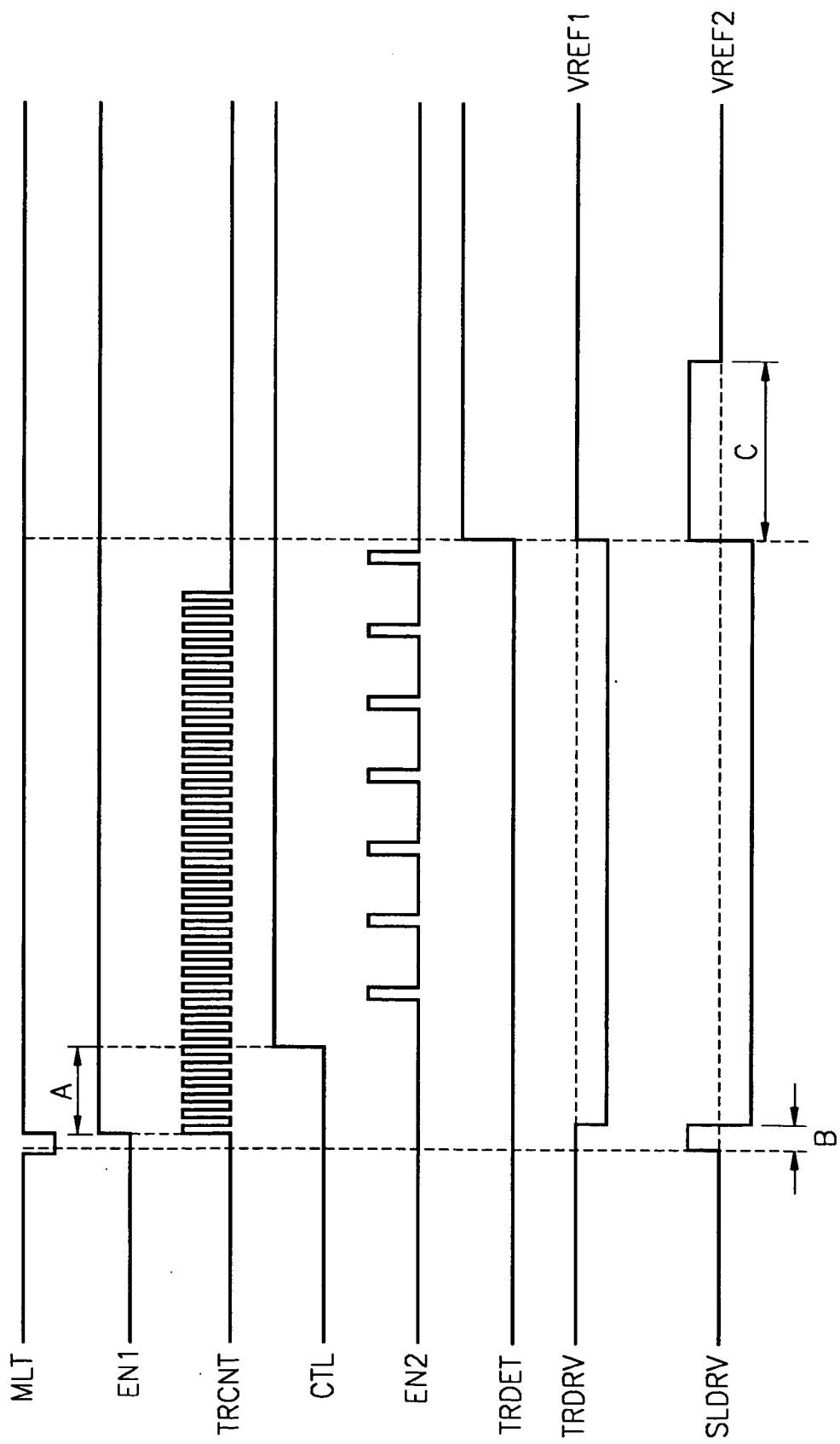
FIG. 9A is a timing diagram showing major signals input to and output from the optical pickup movement determiner of FIG. 8.

In step 1300, the sled servo driver 111 outputs to the sled motor 114 the sled servo drive signal SLDRV with a voltage level less than a second reference voltage level VREF2, i.e., a reverse kick voltage level, as shown in FIG. 9A, in response to the first sled servo control signal SCTL1. The sled motor 114 moves the optical pickup 102 toward the inner perimeter of the optical disc 101 in response to the sled servo drive signal SLDRV. Here, a rotation direction of the sled motor 114 is determined by the voltage level of the sled servo drive signal SLDRV. The sled motor 114 rotates in a forward direction when the voltage level of the sled servo drive signal SLDRV is greater than the second reference voltage level VREF2, in a reverse direction when the voltage level of the sled servo drive signal SLDRV is less than the second reference voltage level VREF2, and stops rotating when the voltage level of the sled servo drive signal SLDRV is equal to the second reference voltage level VREF2.

Prior to step 1300, as shown in FIG. 9A, the sled servo driver 111 may output the sled servo drive signal SLDRV with a voltage level greater than the second reference voltage level VREF2, i.e., a forward kick voltage level, for a predetermined period of time, i.e., as shown in section B of FIG. 9A, in response to the third sled servo control signal SCTL3. Here, the sled motor 114 moves the optical pickup 102 to the outer perimeter of the optical disc 101 in response to the sled servo drive signal SLDRV, as shown in section B of FIG. 9A. This is to prevent the sled motor 114 from being overloaded when the optical pickup 102 is positioned at the innermost perimeter of the optical disc 101 in an initial state.

In step 1400, as shown in FIG. 9A, the tracking servo driver 110 outputs to the tracking actuator the tracking servo drive signal TRDRV with a voltage level less than a first reference voltage level VREF1, i.e., a reverse jump voltage level, in response to the first tracking servo control signal TCTL1. Then, the tracking actuator of the optical pickup 102 moves the objective lens 31 of the optical pickup 102 toward the inner perimeter of the optical disc 101 in response to the tracking servo drive signal TRDRV.

Here, the tracking actuator moves the objective lens 31 toward the inner or outer perimeter of the optical disc 101 depending on the voltage level of the tracking servo drive signal TRDRV. More specifically, the tracking actuator moves the objective lens 31 toward the inner perimeter of the optical disc 101 when the voltage level of the tracking servo drive signal TRDRV is less than the first reference voltage VREF1, toward the outer perimeter of the optical disc 101 when the voltage level of the tracking servo drive signal TRDRV is greater than the first reference voltage VREF1, and stops its operation when the voltage level of the tracking servo drive signal TRDRV is equal to the first reference voltage VREF1.

Figure 14:
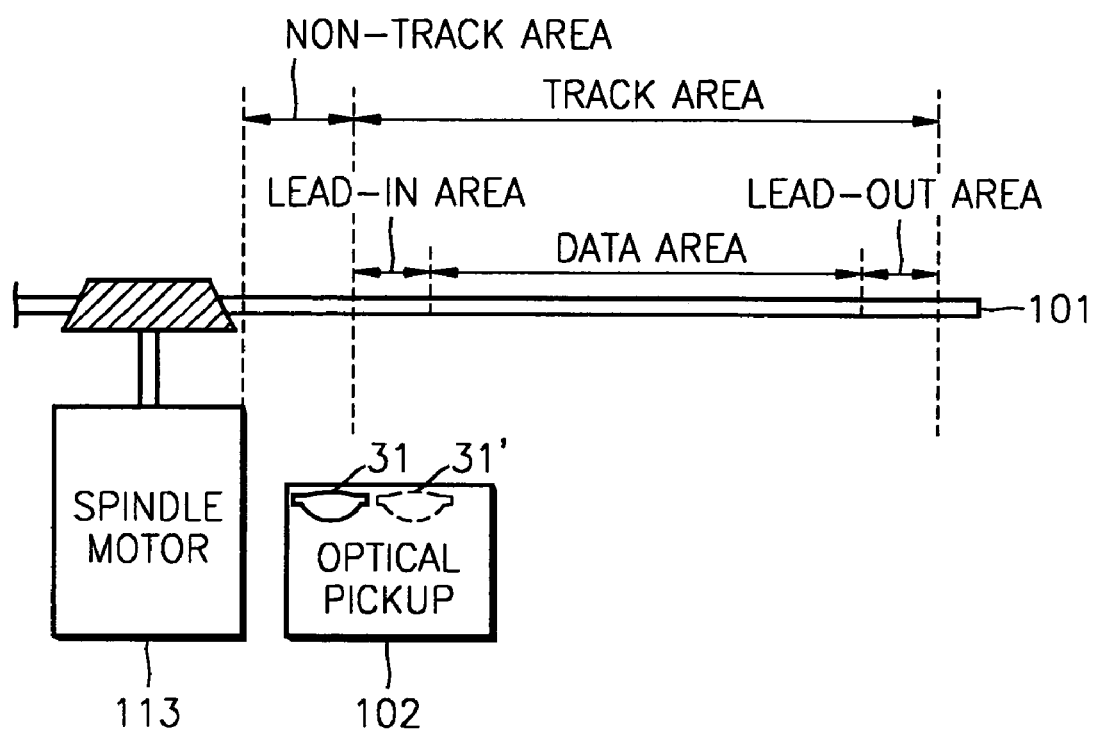
FIG. 14 is a schematic diagram of the optical pickup of the optical disc system of FIG. 4, and a mounted optical disc.

FIG. 14 shows a case where the optical pickup 102 has moved to the innermost perimeter of the optical disc 101 and cannot move any more. Referring to FIG. 14, as depicted with a dotted line, when an objective lens 31' is installed in the center of the optical pickup 102, the objective lens 31' is positioned over a lead-in area of the optical disc 101. As a result, when the optical pickup 102 reaches the innermost perimeter of the optical disc 101, the optical pickup 102 cannot output an RF signal detected from a non-track area of the optical disc 101 unless the objective lens 31' moves toward the inner perimeter of the optical disc 101. Therefore, as depicted with a solid line, the objective lens 31' must move in the optical pickup 102 toward the inner perimeter of the optical disc 101 to the position indicated by reference numeral 31.

The optical pickup 102, while moving toward the inner perimeter of the optical disc 101, radiates the laser beam onto the optical disc 101 and detects light reflected from the optical disc 101. The RF amplifier 103 converts the reflected light into an electric signal to output track-related signals. The track-related signals include the track zero-cross signal TZC, the mirror signal MIRR, and the track change signal TRCNT. In FIG. 4, the RF amplifier 103 outputs only the track zero-cross signal TZC, the mirror signal MIRR, and the track change signal TRCNT. However, in a case of a blank CD on which data is not recorded, the RF amplifier 103 may output a virtual track signal for recording, i.e., a wobble signal WOBB.

In step 1500, the SSP 105 receives one of the track zero-cross signal TZC, the mirror signal MIRR, and the track change signal TRCNT, or in the case of the blank CD, the wobble signal WOBB.

In step 1600, the SSP 105 determines whether tracks are detected on the optical disc 101 at the position of the optical pickup 102. The SSP 105 outputs the second sled servo control signal SCTL2 and the second tracking servo control signal TCTL2 when the non-track area is detected on the optical disc 101, i.e., when the optical pickup 102 reaches the innermost perimeter of the optical disc 101. Step 1600 performed by the SSP 105 will be explained later in more detail with reference to FIGS. 8 through 10.

In step 1700, in response to the second sled servo control signal SCTL2, the sled servo driver 111 outputs the sled servo drive signal SLDRV with a voltage level equal to the second reference voltage level VREF2 to stop the operation of the sled motor 114. Also, in response to the second tracking servo control signal TCTL2, the tracking servo driver 110 outputs the tracking servo drive signal TRDRV with a voltage level equal to the first reference voltage level VREF1 to stop the operation of the tracking actuator. Here, the SSP 105 enables and outputs a track determination signal TRDET to the MCU 106 to inform the MCU 106 that the optical pickup 102 has reached the innermost perimeter of the optical disc 101.

Next, the MCU 106 receives the track determination signal TRDET from the SSP 105 and performs a control operation to read TOC information from the optical disc 101.

Figure 5:
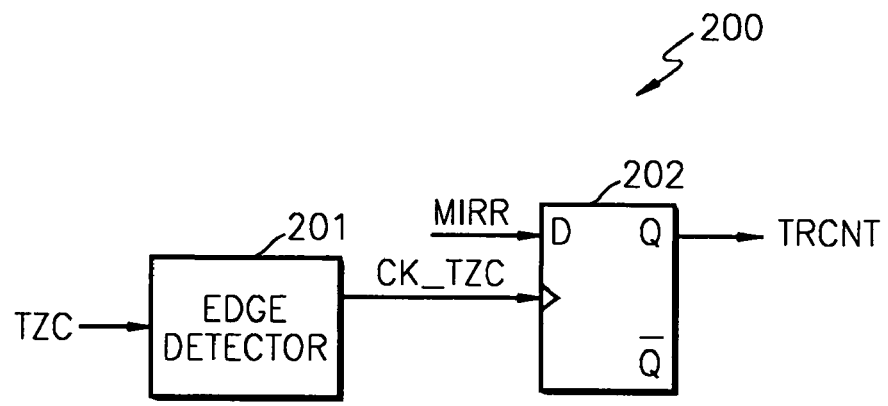
FIG. 5 is a block diagram of an example of a track change signal generator of an RF amplifier of FIG. 4.
Figure 6:
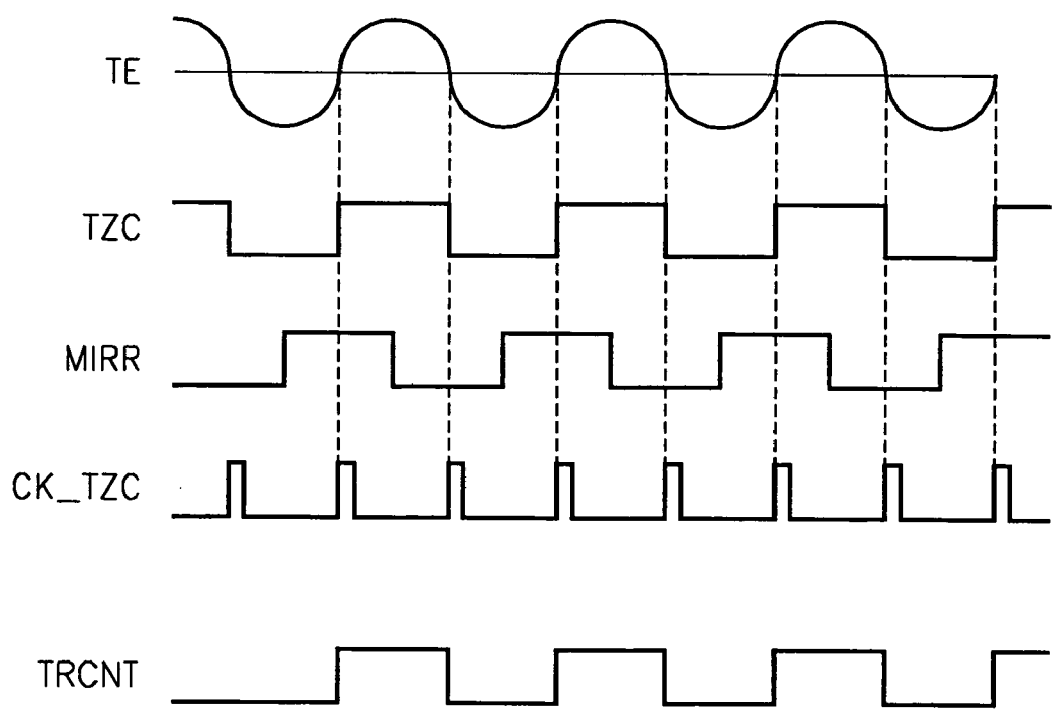
FIG. 6 is a timing diagram showing major signals input to and output from the track change signal generator of FIG. 5.

FIG. 5 is a block diagram of a track change signal generator 200 of the RF amplifier 103 of FIG. 4. Referring to FIG. 5, the track change signal generator 200 includes an edge detector 201 and a D flip-flop 202. As shown in FIG. 6, the edge detector 201 generates and outputs a pulse signal CK_TZC at rising and falling edges of the track zero-cross signal TZC. The D flip-flop 202 receives the mirror signal MIRR as a D input and receives the pulse signal CK_TZC as a clock input. The D flip-flop 202 also outputs the track change signal TRCNT, as shown in FIG. 6, in response to the mirror signal MIRR and the pulse signal CK_TZC. As can be seen in FIG. 6, the track zero-cross signal TZC is a digital signal obtained by slicing the tracking error signal TE.

Figure 8:
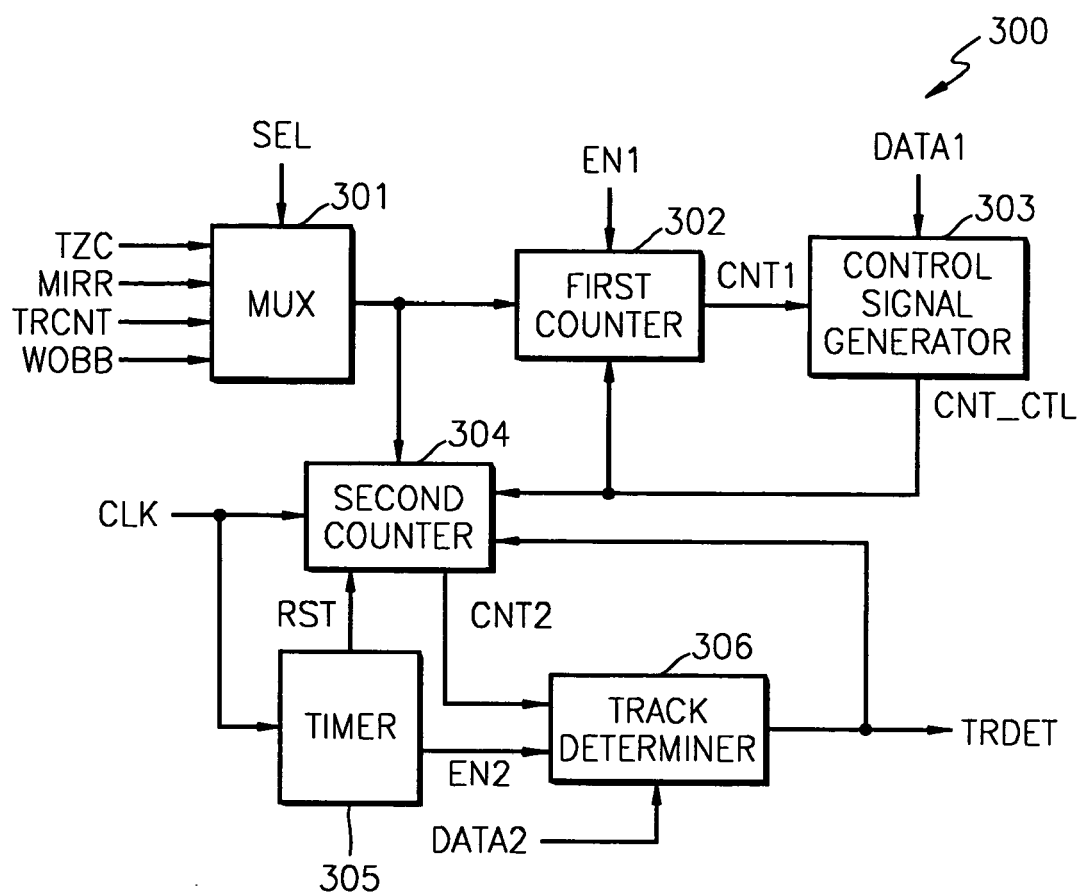
FIG. 8 is a block diagram of an optical pickup movement determiner of a servo signal processor (SSP) of FIG. 4.

Step 1600 will be explained below, but first, FIG. 8 is a block diagram of an optical pickup movement determiner 300 of the SSP 105 of FIG. 4. Referring to FIG. 8, the optical pickup movement determiner 300 includes a multiplexer (MUX) 301, a first counter 302, a control signal generator 303, a second counter 304, a timer 305, and a track determiner 306.

The MUX 301 selects one of the track zero-cross signal TZC, the mirror signal MIRR, and the track change signal TRCNT in response to the selection signal SEL output from the MCU 106 of FIG. 4 and outputs the selected signal to the first counter 302 and the second counter 304. In the case of a blank CD, the MUX 301 outputs the virtual track signal for recording, i.e., the wobble signal WOBB.

The first counter 302 counts a number of times a signal is output from the MUX 301, as shown in section A of FIG. 9A, in response to the first enable signal EN1 output from the MCU 106. In addition, the first counter 302 outputs the accumulated count value as a first count value CNT1. Here, an additional control circuit in the SSP 105 may generate the first enable signal EN1 in response to the limit check command MLT output from the MCU 106.

The control signal generator 303 receives the first count value CNT1 from the first counter 302 and compares the first count value CNT1 with the first data DATA1 received from the MCU 106. The first data DATA1 includes predetermined bits and refers to information on a number of tracks set by the MCU 106. When the first count value CNT1 is equal to the first data DATA1, the control signal generator 303 outputs a counting control signal CNT_CTL.

Here, in a case where data is recorded only in a portion of an inner area of the optical disc 101, which may be a CD-writable (R), a CD-rewritable (RW), a DVD-RW, or the like, there are no tracks in an outer area of the disc. When the optical pickup 102 is positioned over the outer area, the optical pickup movement determiner 300 may incorrectly determine that the optical pickup 102 has moved to the innermost perimeter of the optical disc 101. Thus, after the track zero-cross signal TZC, the mirror signal MIRR, or the track change signal TRCNT is output a number of times set by the MUX 301, the first counter 302 and the control signal generator 303 are used so that the optical pickup movement determiner 300 starts determining whether tracks are detected on the optical disc 101 at the position of the optical pickup 102. The first counter 302 stops its counting operation in response to the counting control signal CNT_CLT. The counting control signal CNT_CLT is applied as a hold signal to the first counter 302.

The second counter 304 counts up or counts down the number of times the signal is output from the MUX 301 in response to a clock signal CLK and the counting control signal CNT_CLT. For example, assume that the signal output from the MUX 301 is the track change signal TRCNT. As shown in FIG. 9B, the second counter 304 counts up or counts down the track change signal TRCNT every period of the clock signal CLK according to a voltage level of the track change signal TRCNT and accumulates count values. The second counter 304 counts up the track change signal TRCNT when the track change signal TRCNT is at a high voltage level, and counts down the track change signal TRCNT when the track change signal TRCNT is at a low voltage level.

The result of the counting up and counting down of the second counter 304 can be represented with data of a predetermined number of bits, for example, 16-bit data of "16'h0000", although the number of bits may vary. When a most significant bit of 16-bit data "0000~FFFF" is inverted, the 16-bit data is changed into "8000~0000~7FFF". Thus, when the count value of the second counter 304 is 16-bit data, the accumulated count value may be expressed with "8000~0000~7FFF".

Here, when counting down, the second counter 304 counts from "0000" to "8000" and holds the count when the accumulated count value is "8000". When counting normally, the second counter 304 counts from "0000" to "7FFF" and holds the count when the accumulated count value is "7FFF". Accordingly, when the most significant bit of the accumulated count value of the second counter 304 is "1", the second counter 304 performs the counting down operation a greater number of times than the number of times the counting up operation was performed. In contrast, when the most significant bit of the accumulated count value is "0", the second counter 304 performs the counting up operation a greater number of times than the number of times the counting down operation was performed. Here, the most significant bit serves as a sign bit. In more detail, if the most significant bit is "1", it is a positive sign bit. And, if the most significant bit is "0", it is a negative sign bit.

The second counter 304 outputs the accumulated count value as a second count value CNT2. Here, the second counter 304 resets the second count value CNT2 to "0000" and restarts the counting operation in response to a reset signal RST output from the timer 305. The timer 305 receives the clock signal CLK and outputs the reset signal RST and a second enable signal EN2 at predetermined time intervals. As shown in FIG. 9A, the timer 305 enables the second enable signal EN2 at predetermined time intervals. The predetermined time intervals correspond to limit check periods set by the MCU 106. Here, the timer 305 first outputs the second enable signal EN2 and then outputs the reset signal RST after one period of the clock signal CLK.

The track determiner 306 receives the second count value CNT2 and compares it with the second data DATA2 received from the MCU 106. The second data DATA2 is a reference value set by the MCU 106 to determine whether tracks are detected on the optical disc 101 at the position of the optical pickup 102. The number of bits of the second data DATA2 is predetermined. For example, assume that the second data DATA2 is 16-bit data. Here, the second data DATA2 may be set to a predetermined value with a most significant bit of "1".

Here, when the optical pickup 102 reaches the innermost perimeter of the optical disc 101 at which the non-track area is detected, as shown in FIG. 9A, the track change signal (TRCNT) with the low voltage level is successively output. As a result, the second counter 304 successively performs the counting down operation.

Accordingly, when the second count value CNT2 has "1" as its most significant bit, and is less than the second data DATA2, the track determiner 306 determines that the optical pickup 102 has arrived at the innermost perimeter of the optical disc 101. For example, when the second data DATA2 is "9000" and the second count value CNT2 is "8FFF", the second count value CNT2 has "1" as its most significant bit and is less than the second data DATA2. Thus, the track determiner 306 determines that the optical pickup 102 has reached the innermost perimeter of the optical disc 101.

Thereafter, as shown in FIG. 9A, the track determiner 306 enables and outputs the track determination signal TRDET. In response to the track determination signal TRDET, a controller (not shown) of the SSP 105 outputs the second tracking servo control signal TCTL2 and the second sled servo control signal SCTL2 to the tracking servo driver 110 and the sled servo driver 111, respectively, to end the limit check operation.

The MCU 106 performs the control operation to read the TOC information in response to the track determination signal TRDET. In more detail, the SSP 105 outputs the third sled servo control signal SCTL3 to the sled servo driver 111 in response to a control signal (not shown) output from the MCU 106. The sled servo driver 111 then outputs to the sled motor 114 the sled servo drive signal SLDRV with a voltage level greater than the second reference voltage level VREF2, as shown in section C of FIG. 9A, in response to the third sled servo control signal SCTL3, so as to rotate the sled motor 114 in the forward direction. As a result, the optical pickup 102 moves toward the outer perimeter of the optical disc 101 and is positioned over the lead-in area of the optical disc 101.

The track determiner 306 compares the second count value CNT2 with the second data DATA2 whenever the second enable signal EN2 is enabled.

The second counter 304 stops its counting operation in response to the track determination signal TRDET, which is applied as a hold signal to the second counter 304. The second counter 304 does not respond to the reset signal RST if it is received after receiving the track determination signal TRDET.

As previously described with reference to FIG. 8, the second counter 304 counts up the number of times the signal is output from the MUX 301 when the track change signal TRCNT is high, and counts down the number of times the signal is output from the MUX 301 when the track change signal TRCNT is low. However, it may be the other way around. That is, the second counter 304 may count down the number of times the signal is output from the MUX 301 when the track change signal TRCNT is high, and count up the number of times the signal is output from the MUX 301 when the track change signal TRCNT is low. In this case, the second data DATA2 may be set to a predetermined value with the most significant bit of "0". Thus, when the second count value CNT2 has the most significant bit of "0" and is greater than the second data DATA2, the track determiner 306 determines that the optical pickup 102 has moved to the innermost perimeter of the optical disc 101.

Step 1600 performed by the optical pickup movement determiner 300 having the above-described structure will now be described with reference to FIG. 10.

Figure 10:
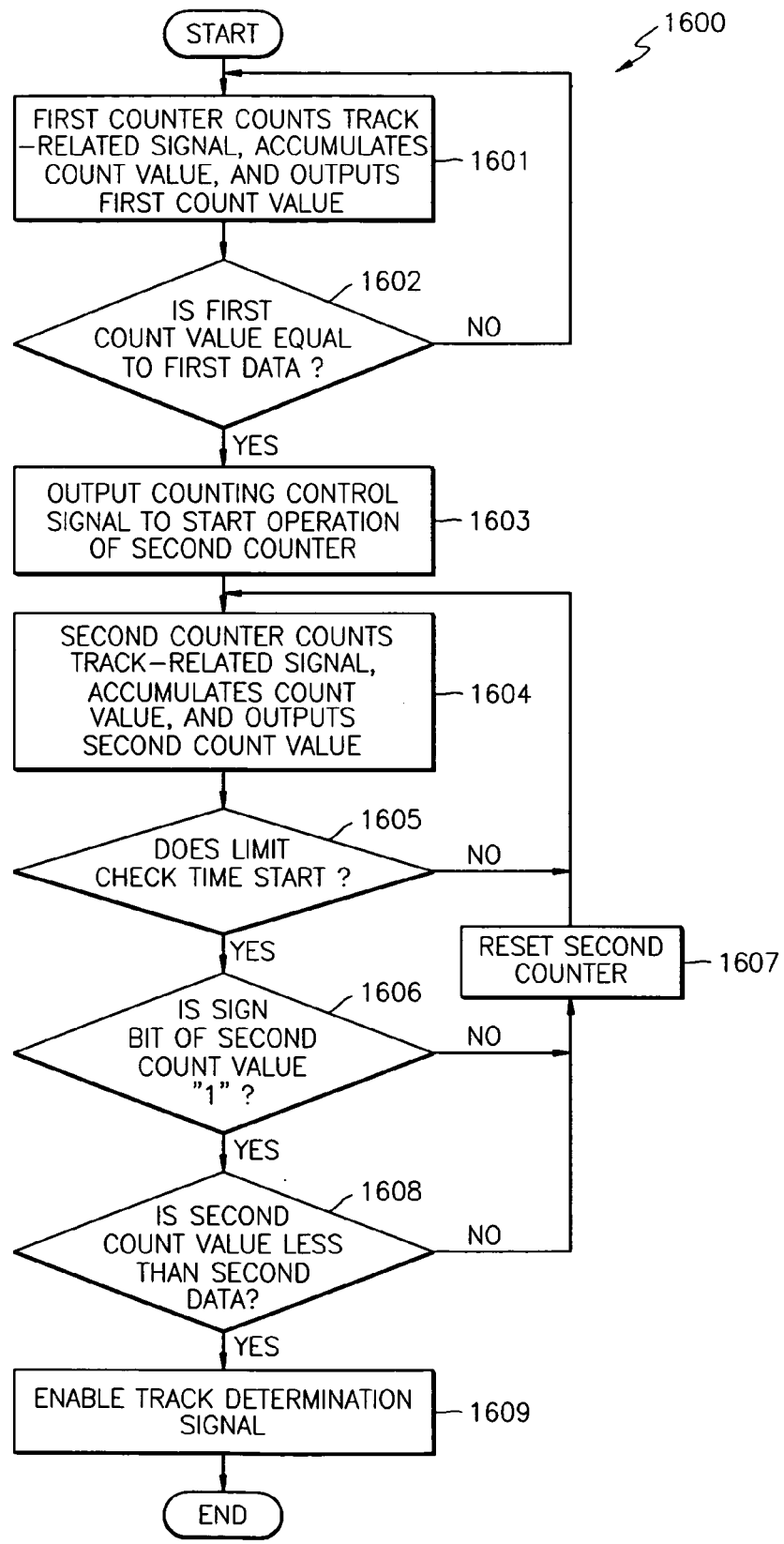
FIG. 10 is a flowchart illustrating an example of step 1600 of FIG. 7.

FIG. 10 is a flowchart illustrating an example of step 1600 of FIG. 7. Referring to FIG. 10, in step 1601, the first counter 302 counts the number of times the track-related signal is output from the MUX 301, accumulates count values, and outputs the result as the first count value CNT1 in response to the first enable signal EN1.

In step 1602, the control signal generator 303 determines whether the first count value CNT1 is equal to the first data DATA1.

If, in step 1602, it is determined that the first count value CNT1 is equal to the first data DATA2, in step 1603, the control signal generator 303 outputs the counting control signal CNT_CTL for starting the operation of the second counter 304. Also, the first counter 302 holds its counting operation in response to the counting control signal CNT_CTL.

In step 1604, the second counter 304 counts the number of times the track-related signal is output, accumulates the count value, and outputs the second count value CNT2 in response to the counting control signal CNT_CTL.

In step 1605, the timer 305 outputs the second enable signal EN2 to inform the track determiner 306 that now is a limit check time. The track determiner 306 then determines in response to the second enable signal EN2 whether tracks are detected on the optical disc 101 at the position of the optical pickup 102.

In step 1606, the track determiner 306 determines whether the sign bit of the second count value CNT2 is "1". If, in step 1606, it is determined that the sign bit of the second count value CNT2 is not "1", the track determiner 306 does not enable the track determination signal TRDET. Thus, in step 1607, the second counter 304 is reset by the reset signal RST output from the timer 305 and the optical pickup movement determiner 300 returns to step 1604.

If, in step 1606, it is determined that the sign bit of the second count value CNT2 is "1", in step 1608, the track determiner 306 determines whether the second count value CNT2 is less than the second data DATA2. Here, if it is determined that the second count value CNT2 is greater than or equal to the second data DATA2, the track determiner 306 returns to step 1607, and if it is determined that the second count value CNT2 is less than the second data DATA2, in step 1609, the track determiner 306 enables the track determination signal TRDET.

When the track determination signal TRDET is enabled, the MCU 106 determines that there are no tracks detected on the optical disc 101 at the current position of the optical pickup 102, i.e., the optical pickup 102 has arrived at the innermost perimeter of the optical disc 101. At this time, the SSP 105 stops the operations of the sled motor 114 and the tracking actuator.

As previously described, in step 1608, the track determiner 306 compares the second count value CNT2 with the second data DATA2. Alternatively, the track determiner 306 may measure a time for which the sign bit of the second count value CNT2 remains at "1". More specifically, If, in step 1606, it is determined that the sign bit of the second count value CNT2 is "1", in an alternative exemplary embodiment to that shown in FIG. 10, the track determiner 306 may determine whether the sign bit of the second count value CNT2 remains at "1" for a predetermined period of time. Here, if the sign bit of the second count value CNT2 changes from "1" into "0" within the predetermined period of time, the track determiner 306 does not enable the track determination signal TRDET. Thus, in step 1607, the second counter 304 is reset by the reset signal RST output from the timer 305 and returns to step 1604. On the other hand, if the sign bit of the second count value CNT2 remains at "1" for the predetermined period of time, in step 1609, the track determiner 306 enables the track determination signal TRDET.

When the track determination signal TRDET is enabled, the MCU 106 determines that there are no tracks detected on the optical disc 101 at the current position of the optical pickup 102, i.e., the optical pickup 102 has arrived at the innermost perimeter of the optical disc 101. At this time, the SSP 105 stops the operations of the sled motor 114 and the tracking actuator.

Figure 11:
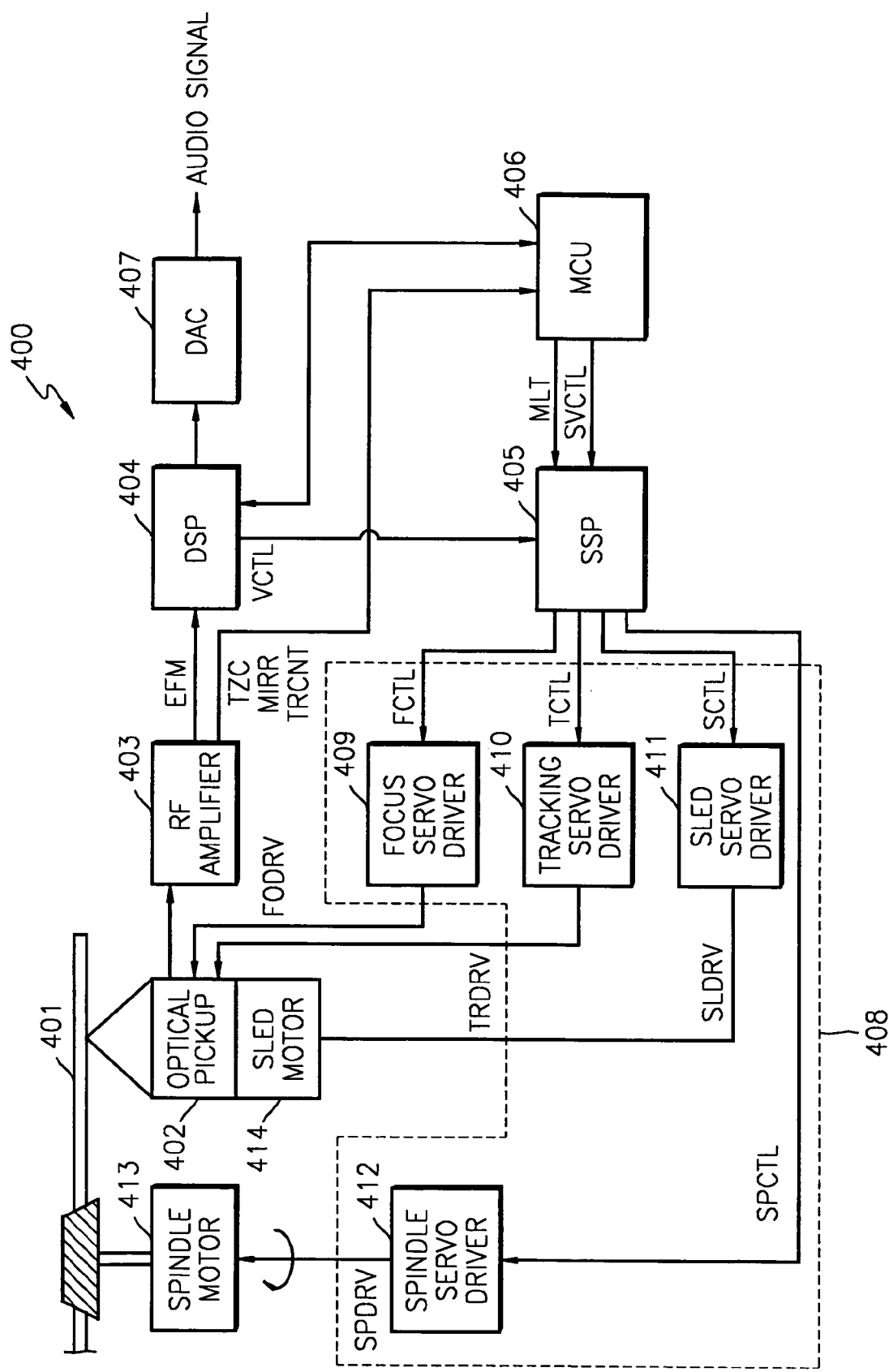
FIG. 11 is a block diagram of an optical disc system for controlling movement of an optical pickup to an innermost perimeter of an optical disc using track information, according to another exemplary embodiment of the present invention.

FIG. 11 is a block diagram of an optical disc system for controlling the movement of an optical pickup to an innermost perimeter of an optical disc using track information, according to another exemplary embodiment of the present invention. Referring to FIG. 11, an optical disc system 400 includes an optical pickup 402, an RF amplifier 403, a DSP 404, an SSP 405, an MCU 406, a DAC 407, a servo driver 408, a spindle motor 413, and a sled motor 414.

The optical disc system 400 is identical in structure and operation to the optical disc system 100 of FIG. 4 except for the following point. In the optical disc system 100, the SSP 105 receives the track zero-cross signal TZC, the mirror signal MIRR, and the track change signal TRCNT from the RF amplifier 103. However, in optical disc system 400, the MCU 406 receives the track zero-cross signal TZC, the mirror signal MIRR, and the track change signal TRCNT from an RF amplifier 403.

Figure 12:
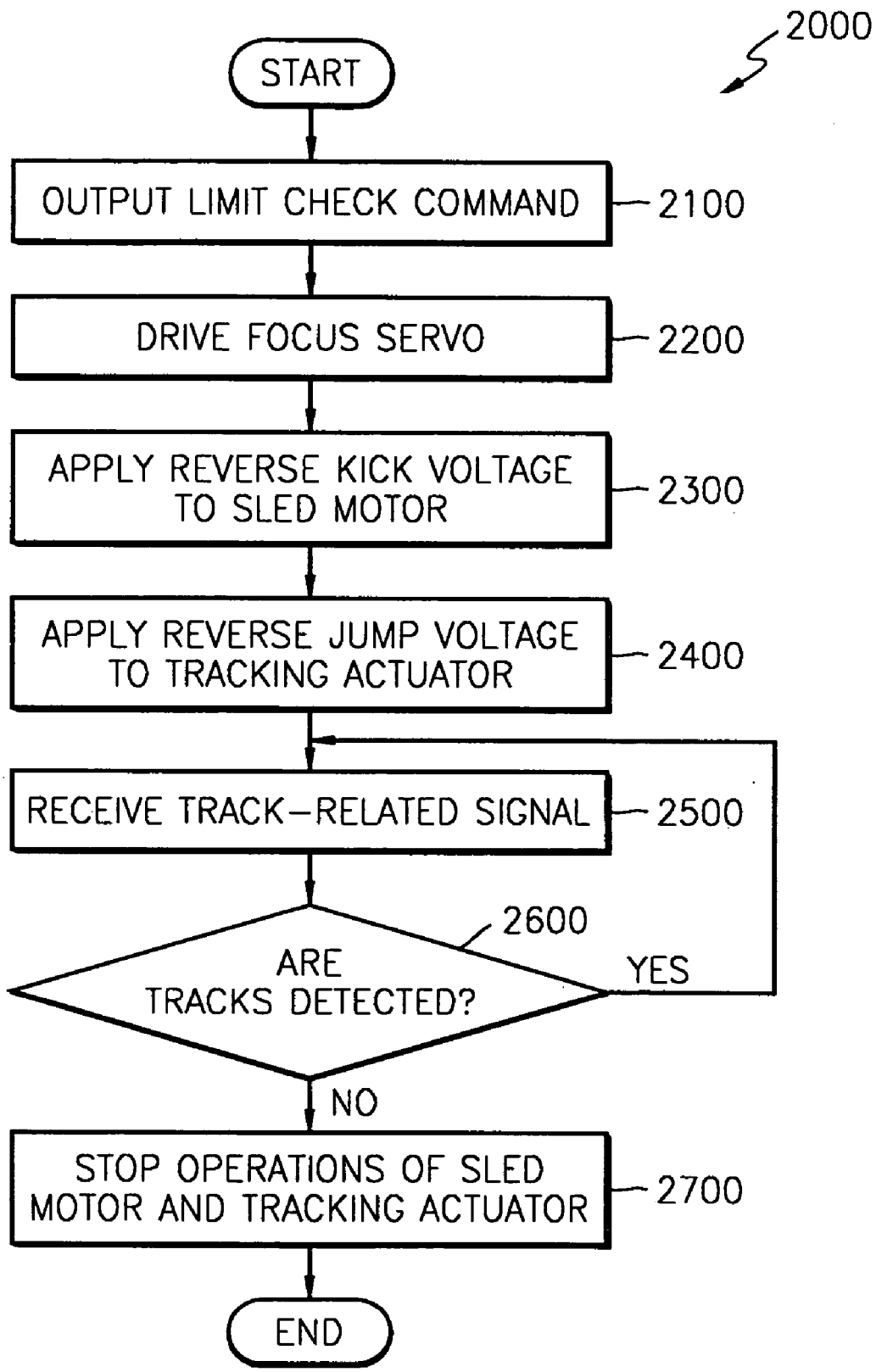
FIG. 12 is a flowchart illustrating a method of controlling the movement of the optical pickup of the optical disc system of FIG. 11 to the innermost perimeter of an optical disc, according to an exemplary embodiment of the present invention.

FIG. 12 is a flowchart illustrating a method of controlling the movement of the optical pickup of the optical disc system of FIG. 11 to the innermost perimeter of an optical disc, according to another exemplary embodiment of the present invention. Referring to FIGS. 11 and 12, operation 2000 of the optical disc system 400 will now be explained.

In step 2100, the MCU 406 outputs a limit check command MLT to the SSP 405.

In step 2200, the SSP 405 outputs a focus servo control signal FCTL, a spindle servo control signal SPCTL, a sled servo control signal SCTL, and a tracking servo control signal TCTL in response to the limit check command MLT. Here, although not shown in FIG. 11, the spindle servo control signal SPCTL includes first and second spindle servo control signals SPCTL1 and SPCTL2, the tracking servo control signal TCTL includes first and second tracking servo control signals TCTL1 and TCTL2, and the sled servo control signal SCTL includes first, second, and third sled servo control signals SCTL1, SCTL2, and SCTL3. Here, the SSP 405 may output the first spindle servo control signal SPCTL1 to rotate the optical disc 401 at a CLV or CAV, or the second spindle servo control signal SPCTL2 to stop rotation the optical disc 401. Also in step 2200, a focus servo driver 409 outputs a focus servo drive signal FODRV in response to the focus servo control signal FCTL, and a focus actuator in the optical pickup 402 moves the optical pickup 402 up and down to focus a laser beam on an optical disc 401 in response to the focus servo drive signal FODRV.

In step 2300, in response to the first sled servo control signal SCTL1, a sled servo driver 411 outputs a sled servo drive signal SLDRV with a voltage level lower than the second reference voltage level VREF2, i.e., a reverse kick voltage level. The sled motor 414 moves the optical pickup 402 toward an inner perimeter of the optical disc 401 in response to the sled servo drive signal SLDRV. However, prior to step 2300, in response to a second sled servo control signal SCTL2, the sled servo driver 411 may output the sled servo drive signal SLDRV with a voltage level greater than the second reference voltage level VREF2, i.e., a forward kick voltage level, for a predetermined period of time. In this case, the sled motor 414 moves the optical pickup 402 toward an outer perimeter of the optical disc 401 in response to the sled servo drive signal SLDRV.

In step 2400, a tracking servo driver 410 outputs the tracking servo drive signal TRDRV with a voltage level less than the first reference voltage VREF1, i.e., a reverse jump voltage level, in response to the first tracking servo control signal TCTL1. A tracking actuator in the optical pickup 402 moves the objective lens 31 of FIG. 14 in the optical pickup 402 toward the inner perimeter of the optical disc 401 in response to the tracking servo drive signal TRDRV.

Thereafter, the optical pickup 402 radiates the laser beam onto the optical disc 401 and detects light reflected therefrom, while moving toward the inner perimeter of the optical disc 401. The RF amplifier 403 converts the reflected light into an electric signal to output the track zero-cross signal TZC, the mirror signal MIRR, and the track change signal TRCNT as track-related signals. However, in the case of a blank CD, the RF amplifier 403 may output a virtual track signal for recording, i.e., a wobble signal WOBB.

In step 2500, the MCU 406 receives one of the track zero-cross signal TZC, the mirror signal MIRR, and the track change signal TRCNT, or in the case of the blank CD, the wobble signal WOBB.

In step 2600, the MCU 406 determines whether tracks are detected on the optical disc 401 at the current position of the optical pickup 402. Here, for the determination 2600, the MCU 406 performs the same operation as the optical pickup movement determiner 300 of FIG. 8, using an internal program. If, in step 2600, it is determined that tracks are not detected on the optical disc 401, i.e., the optical pickup has moved to an innermost perimeter of the optical disc 401, the MCU 406 outputs a limit check completion signal SVCTL to the SSP 405. The SSP 405 then outputs the second sled servo control signal SCTL2 and the second tracking servo control signal TCTL2 in response to the limit check completion signal SVCTL. Step 2600 will be described in more detail below with reference to FIG. 13.

In step 2700, in response to the second sled servo control signal SCTL2, the sled servo driver 411 outputs the sled servo drive signal SLDRV with a voltage level equal to the second reference voltage level VREF2 to stop operation of the sled motor 414. Also in step 2700, in response to the second tracking servo control signal TCTL2, the tracking servo driver 410 outputs the tracking servo drive signal TRDRV with a voltage level equal to the first reference voltage level VREF1.to stop operation of the tracking actuator. Thereafter, the MCU 406 performs a control operation to read TOC information from the optical disc 401. For example, the MCU 406 outputs a predetermined control signal (not shown) to the SSP 405. The SSP 405 then outputs the third sled servo control signal SCTL3 to the sled servo driver 411 in response to the predetermined control signal. The sled servo driver 411 outputs to the sled motor 414 the sled servo drive signal SLDRV with a voltage level greater than the second reference voltage level VREF2 for a predetermined period of time. The sled motor 414 rotates in a forward direction in response to the sled servo drive signal SLDRV. As a result, the optical pickup 402 moves to the outer perimeter of the optical disc 401 and is positioned over a lead-in area of the optical disc 401.

Figure 13:
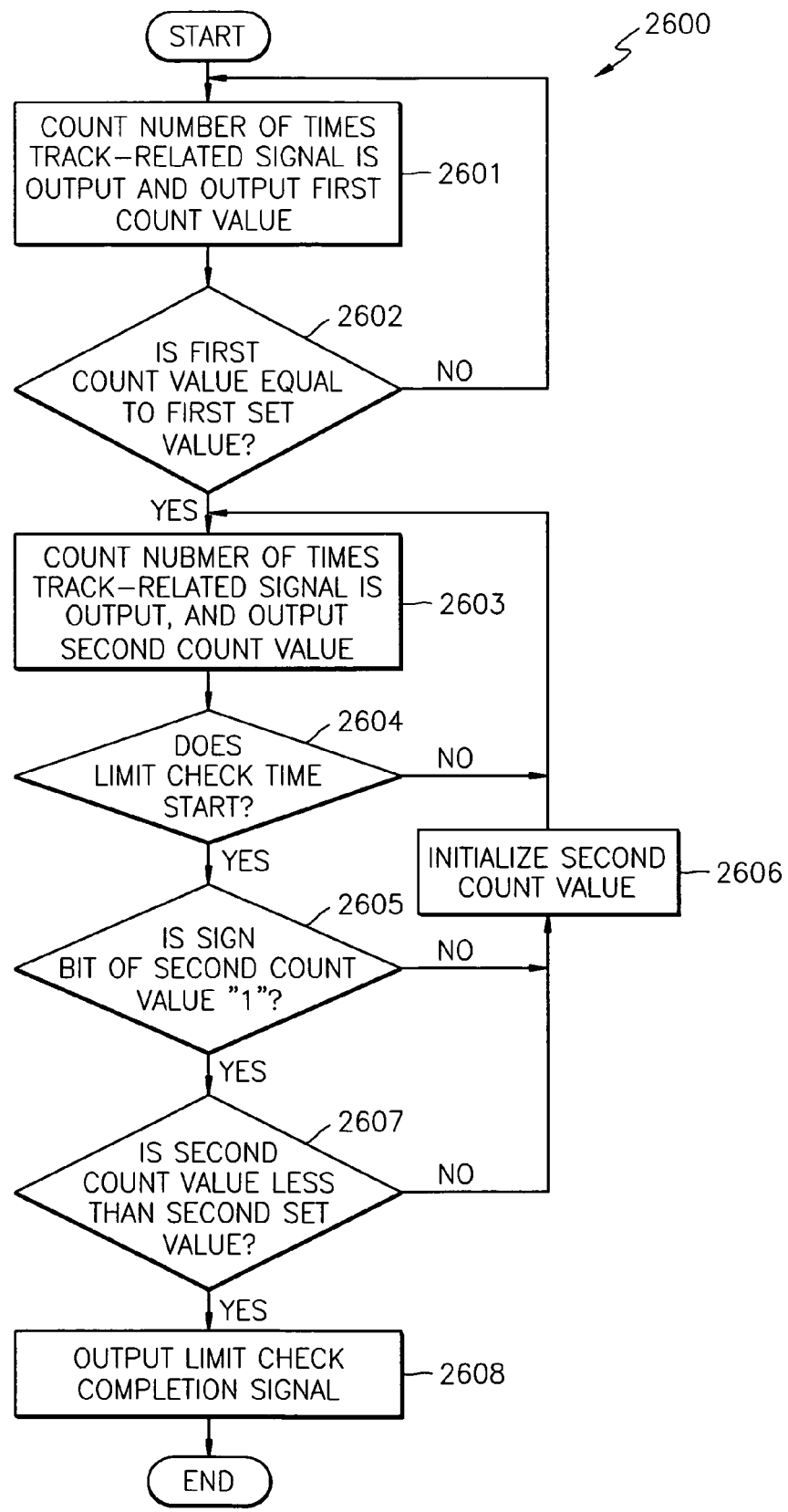
FIG. 13 is a flowchart illustrating an example of step 2600 of FIG. 12.

FIG. 13 is a flowchart of step 2600 of FIG. 12. Referring to FIG. 13, in step 2601, the MCU 406 counts a number of times the track-related signal is output, accumulates count values, and outputs the result as a first count value CNT1. In step 2602, the MCU 406 determines whether the first count value CNT1 is equal to a first set value. If, in step 2602, it is determined that the first count value CNT1 is equal to the first set value, in step 2603, the MCU 406 counts a number of times the track-related signal is output, accumulates count values, and outputs the result as a second count value CNT2.

Here, to be more specific, when the track-related signal is high, the MCU 406 counts up the number of times the track-related signal is output, but when the track-related signal is low, the MCU 406 counts down the number of times the track-related signal is output. The second count value CNT2 can be expressed with data having a predetermined number of bits, for example, 16-bit data of "16'h0000". If a most significant bit of 16-bit data "0000~FFFF" is inverted, the 16-bit data is changed into "8000~0000~7FFF". Thus, when the second count value CNT2 is represented with 16-bit data, the second count value CNT2 may be "8000~0000~7FFF".

Here, the MCU 406, when counting down, counts from "0000" to "8000" and holds the count when the count is "8000", and when counting normally, the MCU 406 counts from "0000" to "7FFF" and holds the count when the count is "7FFF". Accordingly, when the number of times the counting up operation is performed is greater than the number of times the counting down operation is performed, the second count value CNT2 has a most significant bit of "1". In contrast, when the number of times the counting down operation is performed is greater than the number of times the counting up operation is performed, the second count value CNT2 has a most significant bit of "0". Here, the most significant bit serves as a sign bit.

In step 2604, the MCU 406 determines whether a limit check time starts.

If, in step 2604, it is determined that the limit check time starts, in step 2605, the MCU 406 determines whether the sign bit of the second count value CNT2 is "1".

If, in step 2605, it is determined that the sign bit of the second count value CNT2 is not "1", in step 2606, the MCU 406 initializes the second count value CNT2 and returns to step 2603.

If, in step 2605, it is determined that the sign bit of the second count value CNT2 is "1", in step 2607, the MCU 406 determines whether the second count value CNT2 is less than the second set value. Here, the second set value may be a predetermined value with a most significant bit of "1". If it is determined that the second count value CNT2 is greater than or equal to the second set value, the MCU 406 returns to step 2606. If it is determined that the second count value CNT2 is less than the second set value, in step 2608, the MCU 406 outputs the limit check completion signal SVCLT to the SSP 405. The SSP 405 then stops the operations of the sled motor 414 and the tracking actuator.

As previously described with reference to FIG. 13, when the track-related signal is high, the MCU 406 counts up the number of times the track-related signal is output. However, when the track-related signal is low, the MCU 406 counts down the number of times the track-related signal is output. Alternatively, the situation may be reversed such that when the track-related signal is high, the MCU 406 counts down, and when the track-related signal is low, the MCU 406 counts normally. In this case, the second set value may be a predetermined value with a most significant bit of "0".

Accordingly, when the second count value CNT2 has a most significant bit of "0" and is greater than the second set value, the MCU 406 determines that the optical pickup 402 has moved to the innermost perimeter of the optical disc 401.

As previously described, in step 2607, the MCU 406 compares the second count value CNT2 with the second set value. However, in an alternative exemplary embodiment to that shown in FIG. 13, in step 2607, the MCU 406 may measure a time for which the sign bit of the second count value CNT2 remains at "1". In more detail, if it is determined in step 2605 that the second count value CNT2 has the sign bit of "1", the MCU 406 may determine whether it remains at "1" for a predetermined period of time. When the sign bit of the second count value CNT2 changes into "0" within the predetermined period of time, the MCU 406 initializes the second count value CNT2 and returns to step 2603. When the sign bit of the second count value CNT2 remains at "1" for the predetermined period of time, in step 2608, the MCU 406 outputs the limit check completion signal SVCTL to the SSP 405. The SSP 405 then stops the operations of the sled motor 414 and the tracking actuator.

As described above, in an optical disc system and method for controlling movement of an optical pickup to an innermost perimeter of an optical disc using track information, according to the exemplary embodiments of the present invention, time required for reading TOC information can be reduced. Also, the movement of the optical pickup to the innermost perimeter of the optical disc can be accurately controlled.

Moreover, the optical pickup can be controlled to move to an innermost perimeter of a disc on which data is recorded only in a portion of an inner area or of a blank disc on which data is not recorded.

Furthermore, even when only a focus servo is driven, the optical disc system can control the optical pickup to move to the innermost perimeter of the optical disc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disc system comprising:
   an optical pickup that radiates a laser beam onto the optical disc to detect light reflected from the optical disc, wherein the optical pickup comprises a tracking actuator, a focus actuator, and an objective lens;
   a radio frequency amplifier that converts the reflected light into an electric signal to output a track-related signal;
   a sled motor that moves the optical pickup toward an inner or outer perimeter of the optical disc in response to a sled servo drive signal;
   a servo driver that outputs the sled servo drive signal and a tracking servo drive signal in response to one of a first servo control signal, and a second servo control signal; and
   a servo signal processor that comprises an optical pickup movement determiner and outputs one of the first servo control signal and the second servo control signal, the optical pickup movement determiner determining from the track-related signal whether tracks are detected on the optical disc at a current position of the optical pickup and outputting a track determination signal indicating whether the optical pickup has moved to the innermost perimeter of the optical disc, based on the determination result,
   wherein the tracking actuator moves the objective lens toward the inner or outer perimeter of the optical disc in response to the tracking servo drive signal.

2. The optical disc system of claim 1, further comprising a micro controller unit that outputs a limit check command and determines in response to the track determination signal whether the optical pickup has moved to the innermost perimeter of the optical disc,
   wherein the servo signal processor outputs the first servo control signal in response to the limit check command,
   the servo driver outputs the sled servo drive signal with a first voltage level and the tracking servo drive signal with a second voltage level in response to the first servo control signal,
   the sled motor moves the optical pickup toward the inner perimeter of the optical disc in response to the sled servo drive signal with the first voltage level, and
   the tracking actuator moves the objective lens toward the inner perimeter of the optical disc in response to the tracking servo drive signal with the second voltage level.

3. The optical disc system of claim 1, wherein when the optical pickup movement determiner determines that tracks are not detected on the optical disc at the current position of the optical pickup, the optical pickup movement determiner enables and outputs the track determination signal.

4. The optical disc system of claim 3, wherein:
   the servo signal processor outputs the second servo control signal when the track determination signal is enabled;
   the servo driver outputs the sled servo drive signal with a third voltage level and the tracking servo drive signal with a fourth voltage level in response to the second servo control signal;
   the sled motor stops movement of the optical pickup in response to the sled servo drive signal with the third voltage level; and
   the tracking actuator stops movement of the objective lens in response to the tracking servo drive signal with the fourth voltage level.

5. The optical disc system of claim 3, wherein:
   the servo signal processor further outputs a third servo control signal when the track determination signal is enabled;
   the servo driver outputs the sled servo drive signal with a fifth voltage level for a first period of time in response to the third servo control signal; and
   the sled motor moves the optical pickup toward the outer perimeter of the optical disc for the first period of time in response to the sled servo drive signal with the fifth voltage level.

6. The optical disc system of claim 2, wherein the track-related signal is one of a track zero-cross signal, a mirror signal, and a track change signal.

7. The optical disc system of claim 6, wherein the radio frequency amplifier comprises a track change signal generator that generates the track change signal in response to the track zero-cross signal and the mirror signal.

8. The optical disc system of claim 6, wherein the optical pickup movement determiner comprises:
   a first counter that starts a counting operation in response to a counting control signal, counts a number of times the track-related signal is output, in response to a clock signal, accumulates count values, and outputs the result as a first count value;

a track determiner that determines from the first count value whether tracks are detected on the optical disc at the current position of the optical pickup and outputs the track determination signal, based on the determination result, in response to a first enable signal; and a timer that receives the clock signal and outputs a reset signal and the first enable signal every second period of time.

9. The optical disc system of claim 8, wherein the timer outputs the reset signal after outputting the first enable signal.

10. The optical disc system of claim 8, wherein the optical pickup movement determiner further comprises a multiplexer that outputs one of the track zero-cross signal, the mirror signal, and the track change signal as the track-related signal in response to a selection signal.

11. The optical disc system of claim 8, wherein the optical pickup movement determiner further comprises:

a second counter that counts the number of times the track-related signal is output, accumulates the count value, and outputs a second count value in response to a second enable signal; and a first control signal generator that compares the second count value with a second set value and, if the second count value is equal to the second set value, outputs the counting control signal.

12. The optical disc system of claim 11, wherein the servo signal processor further comprises a second control signal generator that generates the second enable signal in response to the limit check command.

13. The optical disc system of claim 8, wherein the first counter counts up the number of times the track-related signal is output every period of the clock signal when the track-related signal is high, and counts down the number of times the track-related signal is output every period of the clock signal when the track-related signal is low.

14. The optical disc system of claim 13, wherein:

the first count value comprises a plurality of bits comprising at least one sign bit; and the first counter outputs the first count value comprising a positive sign bit when the number of times counting up is performed is greater than the number of times counting down is performed, and the first counter outputs the first count value comprising a negative sign bit when the number of times counting up is performed is less than the number of times counting down is performed.

15. The optical disc system of claim 14, wherein:

the track determiner enables the track determination signal when the first count value is less than a first set value; and the first set value comprises a plurality of bits comprising a negative sign bit.

16. The optical disc system of claim 14, wherein the track determiner enables the track determination signal when the first counter outputs the first count value comprising the negative sign bit for a third period of time.

17. The optical disc system of claim 8, wherein the first counter is reset in response to the reset signal to restart the counting operation, holds the first count value when the track determination signal is enabled, and does not respond to the reset signal received after receiving the track determination signal.

18. The optical disc system of claim 8, wherein the first counter counts up the number of times the track-related signal is output every period of the clock signal when the track-related signal is low, and counts down the number of times the track-related signal is output every period of the clock signal when the track-related signal is high.

19. The optical disc system of claim 18, wherein:

the first count value comprises a plurality of bits comprising at least one sign bit; and the first counter outputs the first count value comprising a negative sign bit when the number of times counting up is performed is greater than the number of times counting down is performed and, and the first counter outputs the first count value comprising a positive sign bit when the number of times counting up is performed is less than the number of times counting down is performed.

20. The optical disc system of claim 19, wherein:

the track determiner enables the track determination signal when the first count value is greater than a first set value; and the first set value comprises a plurality of bits comprising a positive sign bit.

21. The optical disc system of claim 19, wherein the track determiner enables the track determination signal when the first counter outputs the first count value comprising the positive sign bit for a third period of time.

22. The optical disc system of claim 2, wherein the optical disc is a blank disc on which data is not recorded, and the track-related signal is a wobble signal that is a virtual track signal for recording.

23. The optical disc system of claim 2, further comprising a spindle motor that rotates the optical disc at a constant linear velocity or a constant angular velocity in response to a first spindle servo drive signal and stops rotation of the optical disc in response to a second spindle servo drive signal, wherein the servo driver further outputs the first spindle servo drive signal or the second spindle servo drive signal in response to the first servo control signal.

24. A method of controlling movement of an optical pickup of an optical disc system, the method comprising:

a micro controller unit outputting a limit check command;

a servo signal processor driving a focus servo using a focus actuator of an optical pickup in response to the limit check command;

applying a reverse kick voltage to a sled motor;

applying a reverse jump voltage to a tracking actuator of the optical pickup;

an optical pickup movement determiner of the servo signal processor receiving a track-related signal and determining whether tracks are detected on an optical disc at a current position of the optical pickup;

if it is determined that tracks are detected, returning to the steps of receiving of the track-related signal and determining whether the tracks are detected on the optical disc; and if it is determined that tracks are not detected, stopping operations of the sled motor and the tracking actuator.

25. The method of claim 24, the receiving of the track-related signal and determining whether the tracks are detected on the optical disc further comprising:

a first counter of the servo signal processor counting a number of times the track-related signal is output, accumulates count values, and outputting the result as a first count value in response to a counting control signal;

a track determiner of the servo signal processor receiving the first count value every limit check period and determining from the first count value whether tracks are detected on the optical disc at the current position of the optical pickup;

if it is determined that tracks are detected, resetting the first counter and repeating the counting of the number of times the track-related signal is output, outputting the result as the first count value in response to the counting control signal, receiving the first count value every limit check period, and determining from the first count value whether tracks are detected; and if it is determined that tracks are not detected, enabling a track determination signal.

26. The method of claim 25, wherein the counting of the number of times the track-related signal is output, and outputting the result as the first count value in response to the counting control signal comprises:

a second counter of the servo signal processor counting a number of times the track-related signal is output, accumulates count values, and outputting the result as a second count value in response to an enable signal; and a control signal generator of the servo signal processor comparing the second count value with a first set value and, if the second count value is equal to the first set value, outputting the counting control signal.

27. An optical disc system comprising:

an optical pickup that radiates a laser beam onto the optical disc to detect light reflected from the optical disc, wherein the optical pickup comprises a tracking actuator, a focus actuator, and an objective lens;

a radio frequency amplifier that converts the reflected light into an electric signal to output a track-related signal;

a sled motor that moves the optical pickup toward an inner perimeter of the optical disc in response to a first sled servo drive signal, and toward an outer perimeter of the optical disc in response to a second sled servo drive signal;

a servo driver that outputs the first sled servo drive signal and a first tracking servo drive signal in response to a first servo control signal, and outputs the second sled servo drive signal and a second tracking servo drive signal in response to a second servo control signal;

a micro controller unit that outputs a limit check command, determines from the track-related signal whether tracks are detected on the optical disc at a current position of the optical pickup and, if it is determined that tracks are not detected, the micro controller unit outputs a limit check completion signal; and a servo signal processor that outputs the first servo control signal in response to the limit check command and outputs the second servo control signal in response to the limit check completion signal, wherein the tracking actuator moves the objective lens toward the inner perimeter of the optical disc in response to the first tracking servo drive signal and toward the outer perimeter of the optical disc in response to the second tracking servo drive signal.

* * * * *